United States Patent
Pratap et al.

(10) Patent No.: US 8,040,820 B2
(45) Date of Patent: Oct. 18, 2011

(54) MODELLING SERVICE FLOWS IN DYNAMIC ACCESS DOMAINS

(75) Inventors: Vibhu Pratap, Mountain View, CA (US); Somarajan Ramakrishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 11/682,611

(22) Filed: Mar. 6, 2007

(65) Prior Publication Data

US 2008/0219277 A1    Sep. 11, 2008

(51) Int. Cl.
H04L 12/28    (2006.01)

(52) U.S. Cl. ..................................... 370/254

(58) Field of Classification Search .................. 370/406, 370/203, 229–240, 254–258, 298–306, 351–356, 370/357–395, 395.1, 395.2, 395.21, 395.3, 370/395.31, 395.32, 395.4, 395.41, 395.42, 370/395.43, 395.5, 395.52, 395.53, 395.54, 370/395.6, 395.61, 396–411, 420–429
See application file for complete search history.

(56) References Cited

U.S. PATENT DOCUMENTS

| | | | | |
|---|---|---|---|---|
| 5,708,772 | A * | 1/1998 | Zeldin et al. | 714/25 |
| 5,751,967 | A * | 5/1998 | Raab et al. | 709/228 |
| 5,802,286 | A * | 9/1998 | Dere et al. | 709/220 |
| 6,061,335 | A * | 5/2000 | De Vito et al. | 370/258 |
| 6,195,553 | B1 * | 2/2001 | Claffery et al. | 455/445 |
| 6,614,764 | B1 * | 9/2003 | Rodeheffer et al. | 370/254 |
| 6,798,752 | B1 * | 9/2004 | Pope | 370/254 |
| 6,801,534 | B1 * | 10/2004 | Arrowood et al. | 370/400 |
| 7,027,411 | B1 * | 4/2006 | Pulsipher et al. | 370/254 |
| 7,246,366 | B1 * | 7/2007 | Addington et al. | 725/93 |
| 7,400,611 | B2 * | 7/2008 | Mukherjee et al. | 370/338 |
| 7,421,483 | B1 * | 9/2008 | Kalra | 709/220 |
| 2002/0191250 | A1 * | 12/2002 | Graves et al. | 359/128 |
| 2004/0122952 | A1 * | 6/2004 | Kistler et al. | 709/227 |
| 2004/0172412 | A1 * | 9/2004 | Files et al. | 707/104.1 |
| 2004/0218605 | A1 * | 11/2004 | Gustafsson et al. | 370/395.2 |
| 2005/0065805 | A1 * | 3/2005 | Moharram | 705/1 |
| 2005/0066036 | A1 * | 3/2005 | Gilmartin | 709/226 |
| 2005/0105905 | A1 * | 5/2005 | Ovadia et al. | 398/47 |
| 2005/0130701 | A1 * | 6/2005 | Zendle | 455/555 |
| 2005/0152271 | A1 * | 7/2005 | Rindborg et al. | 370/230 |

(Continued)

OTHER PUBLICATIONS

Cisco Systems, Inc. The Value of Subscribing to Managed Metro Ethernet Services from Service Providers with Cisco QoS Certification. http://www.cisco.com/application/pdf/en/us/guest/netsol/ns465/c654/cdccont_0900aecd803fd58f.pdf. Last accessed Sep. 5, 2007.

(Continued)

*Primary Examiner* — Kwang B Yao
*Assistant Examiner* — Jung-Jen Liu
(74) *Attorney, Agent, or Firm* — Schwegman, Lundberg & Woessner, P.A.

(57) ABSTRACT

A topology aware system that facilitates activation of a new service in a dynamic network is provided. The system automatically determines changes in network topology and provides current topology information to determine an optimal service activation path for the new service. The optimal service path is determined by combination of shortest path using standardized algorithms over discovered adjacencies, logical roles assigned to devices and a service-hub for a particular UNI. The service hub is discovered automatically by employing current topology information determined by the system itself. Thus, the system can activate a new service to a dynamic network without any manual topology feed.

15 Claims, 12 Drawing Sheets

U.S. PATENT DOCUMENTS

| | | | |
|---|---|---|---|
| 2005/0160180 A1* | 7/2005 | Rabje et al. | 709/238 |
| 2005/0177874 A1* | 8/2005 | Suzuki et al. | 726/26 |
| 2005/0180348 A1* | 8/2005 | Burdick et al. | 370/316 |
| 2005/0251552 A1* | 11/2005 | Champel et al. | 709/204 |
| 2006/0047851 A1* | 3/2006 | Voit et al. | 709/239 |
| 2006/0088036 A1* | 4/2006 | De Prezzo | 370/395.53 |
| 2006/0182034 A1* | 8/2006 | Klinker et al. | 370/238 |
| 2007/0002751 A1* | 1/2007 | Wullert et al. | 370/241 |
| 2007/0008982 A1* | 1/2007 | Voit et al. | 370/401 |
| 2007/0014290 A1* | 1/2007 | Dec et al. | 370/390 |
| 2007/0025256 A1* | 2/2007 | Hertoghs et al. | 370/236.2 |
| 2007/0060169 A1* | 3/2007 | Johansson et al. | 455/453 |
| 2007/0067446 A1* | 3/2007 | Jones et al. | 709/224 |
| 2007/0121503 A1* | 5/2007 | Guo et al. | 370/230 |
| 2008/0101343 A1* | 5/2008 | Monette et al. | 370/352 |
| 2008/0120714 A1* | 5/2008 | Monette et al. | 726/11 |
| 2008/0235376 A1* | 9/2008 | Prytz et al. | 709/225 |

OTHER PUBLICATIONS

Cisco Systems, Inc. Deploying Layer 2 VPN Services. http://www.cisco.com/en/US/products/sw/netmgtsw/ps5331/products_white_paper09186a008017d750.shtml. Last accessed Sep. 5, 2007.

Cisco Systems, Inc. Managed Ethernet—Understanding Metro Ethernet Forum Standards for Services. http://www.cisco.com/en/US/netsol/ns341/ns121/ns389/ns308/networking_solutions_white_paper0900aecd8023758c.shtml. Last accessed Sep. 5, 2007.

Cisco Systems, Inc. ISC L2VPN and VPLS Concepts. http://www.cisco.com/en/US/docs/net_mgmt/ip_solution_center/3.1/l2vpn/user/guide/L2vpn01.html. Last accessed Sep. 5, 2007.

* cited by examiner

MODELLING SERVICE FLOWS IN DYNAMIC ACCESS DOMAINS

TECHNICAL FIELD

The subject disclosure relates generally to dynamic access networks and more specifically to a system that can automatically detect a change in topology of the network and activate a new service without any manual topology feed.

BACKGROUND

Ethernet technology is one of the most common methods of providing both point-to-point and multipoint services employed by service provider industry. Dynamic access networks are employed by service providers to provide a variety of services to customers. These networks are scalable and flexible and can be easily extended to increase reachability and/or bandwidth economically.

In most instances dynamic networks such as Metro Ethernet access networks that support a range of applications efficiently and cost effectively, can be employed to provide services such as those defined by the Metro Ethernet Forum (MEF), to a large number of customers. A Metro Ethernet is a computer network based on the Ethernet standard with a network size that typically falls between the area covered by LAN's (Local Area Networks) and WAN's (Wide Area Networks). Most often, an area anywhere between a small group of buildings to an entire city can be covered by a Metro Ethernet network. Metro Ethernet is commonly used as a metropolitan access network to connect subscribers and businesses to a network and application based services to enterprise and residential customers. Larger businesses can employ Metro Ethernets to connect various branch locations to a company Intranet.

One of the key Ethernet service attributes is the Ethernet Virtual Connection (EVC). An EVC, as defined by the MEF, is "an association of two of more UNIs (User-to-Network Interface)". In other words, every EVC is a logical connection at layer-2 which connects two of more UNIs which might or might not belong to the same Ethernet Access Domain (EAD), wherein a UNI is a standard Ethernet interface that is the point of demarcation between the Customer Premises Equipment (CPE) and the service provider's Metro Ethernet network. Conventionally, when activating a new service, a Network Operations Center (NOC) Operator manually create a new EVC utilizing the current topology of the underlying network.

Metro Ethernet networks are inherently dynamic in nature. Dynamic networks have a continuously changing topology. A change in topology can occur due to various reasons such as addition of new customers, increase in bandwidth or increase in density in a building or a particular area. Service providers can keep adding new devices to the network everyday to extend the topology causing the topology to change on daily basis.

During new service activation, service providers must utilize up-to-date information of the current network topology, to establish an end-to-end service. In dynamic networks however, service providers face the challenge of manually keeping track of the dynamically changing topology. Information regarding the current topology of the network is employed to determine if a new service can be activated.

Conventionally, service providers continuously monitor this dynamically changing topology and manually update the system each time changes occur to accurately activate the service. Manually entering the physical topology data every time for each EVC created by the NOC operator is a cumbersome and error prone process especially when the EAD is dynamic in nature with insertions and removals of devices potentially affecting the deployed EVC. Conventional systems cause existing customers to experience service disruption for a long period of time. Furthermore, conventional systems most often employ an operational team that plans and executes the migration of service with a scheduled down time which further increases operational costs and increases inconvenience by reducing service availability.

DESCRIPTION

Overview

Figure 1:
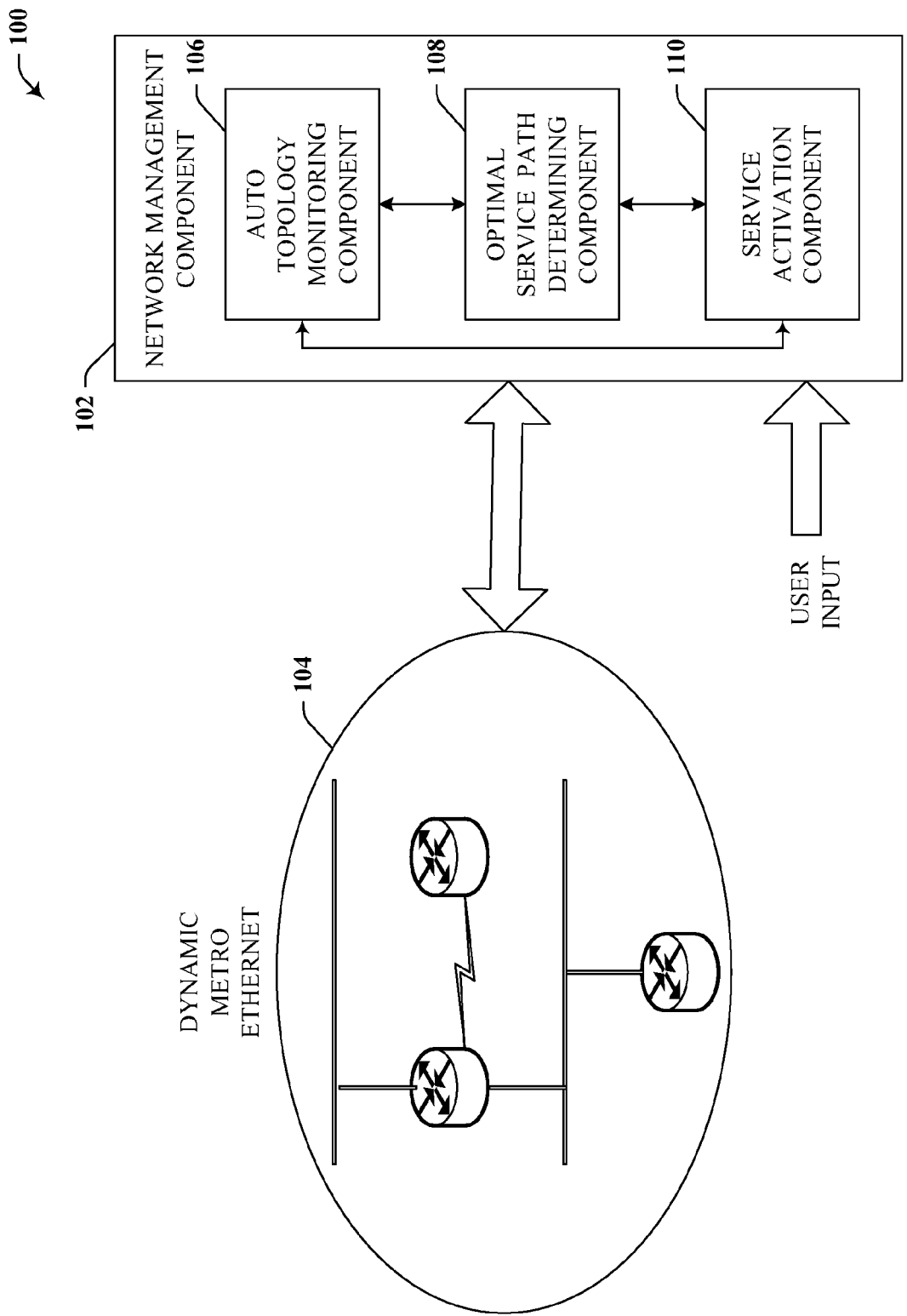
FIG. 1 illustrates a block diagram of an example system that can determine current topology and can be employed to activate a new service in a dynamic network.

The following presents a simplified overview of the claimed subject matter in order to provide a basic understanding of some embodiments described herein. This is not an extensive overview of the claimed subject matter. It is intended to neither identify key or critical elements of the claimed subject matter nor to delineate the scope of that subject matter. Its sole purpose is to present some concepts of the claimed subject matter in a simplified form as a prelude to the more detailed description of example embodiments that is presented later.

The system disclosed and claimed herein, in one aspect thereof, facilitates automatic and/or dynamic monitoring and updating topology changes in a dynamic network. Dynamic networks inherently have a continuously changing network topology wherein nodes and/or edges may come and go. A Metro Ethernet Access network is an example of a dynamic network that allows service providers to use the Ethernet Access Network to provide a variety of services as defined by the Metro Ethernet Forum (MEF). Changes in topology can occur due to various reasons. In aspects, the subject specification discloses a system that can closely monitor and update these changes in network topology without any manual and/or human intervention.

In accordance with another aspect of the system, an auto topology monitoring component is employed to keep track of the changes in the network topology. The system can logically build a new topology by extracting topology information from a database utilized by a Network Management tool whenever a new device is inserted into the network.

One aspect of the system relates to determination of a service-hub automatically depending on whether the UNIs (User-to-Network Interface) picked by an operator belong to the same EAD (Ethernet Access Domain). In addition, in one aspect, the operator can also modify the existing EVC (Ethernet Virtual Connection) to add more UNIs and determine a service-hub for the new UNI.

Furthermore, another aspect of the subject specification relates to an optimal service path determining component that can discover service paths employing device roles and service access points to activate a new service. The optimum service path out of the discovered paths can be determined and can be displayed such that an operator can confirm if a new service should be activated using the determined optimal path.

Another aspect of the claimed subject matter relates to a method that can provide a service activation component with the current topology data, such that the service activation component can determine how to activate the service accurately. The service activation component can activate a new service via the optimal service path determined by the optimal service path determining component or can activate service via any other path selected by the user.

Yet another aspect of the subject specification describes an output display with a graphical user interface. This interface can be employed by the operator to view various network parameters. The operator can view information regarding, and not limited to, the current topology of the network or view the optimal service path determined for new service activation.

The following description and the annexed drawings set forth in detail certain illustrative embodiments of the claimed subject matter. These embodiments may be indicative, however, of but a few of the various ways in which the principles of the claimed subject matter may be employed and the claimed subject matter is intended to include many and/or all such embodiments and their equivalents. Other advantages and novel features of the claimed subject matter will become apparent from the following description of example embodiments when considered in conjunction with the drawings.

DESCRIPTION OF EXAMPLE EMBODIMENTS

The specification is now described with reference to the drawings, wherein like reference numerals are used to refer to like elements throughout. In the following description, for purposes of explanation, numerous specific details are set forth in order to provide a thorough understanding of the subject specification. It may be evident, however, that the specification can be practiced without these specific details. In other instances, well-known structures and devices are shown in block diagram form in order to facilitate describing the specification.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates a system 100 comprising of an optimal service activation component 102 that can monitor changes in topology of a dynamic network and activate a new service by determining an optimal service path for activation. The network monitored by the network management component 102 can be most any type of dynamic network such as Metro Ethernet Access network 104. The Metro Ethernet Access network 104, inherently, has a dynamic topology that can be continuously changed and/or extended to achieve reachability. In order to add more customers, or increase density in a building or a particular area, service providers can insert new devices to the network and extend the network.

The addition/removal of various network devices that causes the topology to change can occur due to various reasons, for example, failure of devices or replacement of devices in the network. The network management component 102 can monitor this continuous change in network topology and determine the optimal service path out of a plurality of available service paths for service activation. When a device is added for a new service, an EAD (Ethernet Access Domain) can be deduced for the new device and a service-hub can be determined by employing topology information. The network management component 102 can dynamically determine topology changes and activate new services accordingly. Although the aspects described herein are directed to a Metro Ethernet, it is to be understood that alternative aspects can be directed to other dynamic networks without departing from the spirit and/or scope of the specification and claims appended hereto.

Most often, the network management component 102 can include an auto topology monitoring component 106 that keeps track of the dynamically changing topology. Service providers can extend the network for achieving reachability and/or increasing density in a particular area. Devices can be added to or removed from the network at any time changing the topology of the network. These changes can be monitored by the auto topology monitoring component 106 and fed back to a provisional system so that the provisional system can understand the topology and activate a service properly.

The current topology information can be employed by the optimal service path determining component 108 that can select an optimal path out of various paths determined for new service activation. Depending on whether the UNIs (User-to-Network Interface) selected by an operator belong to same EAD, the service path can be determined by the adjacencies that are discovered from a database. The optimal service path determining component 108 can determine a service-hub that acts as a demarcation point to service a particular EVC (Ethernet Virtual Connection) between UNIs. The service-hub can be employed to discover a path for activation of a new service. A user can be provided with a display to view the optimal path discovered and can confirm if that path should be employed to activate the service.

The network management tool can also include a service activation component 110 that establishes end to end service connections. The service activation component 110 can employ the optimal path selected by the operator to activate a new service. The service activation component 110 can also update the auto topology monitoring component 106 with any changes in topology due to the activation of the new service.

The network management component 102 can be employed to manage various dynamic characteristics of the controlled network 104. The controlled network 104 is typically dynamic in nature and has parameters that can change over time, such as but not limited to Metro Ethernet Access networks. A Metro Ethernet Access network can be a public city-wide or regional LAN (local area network) comprising high speed broadband networks. Such networks most often use wireless infrastructure or optical fiber connections and typically range in size from 5 to 200 kilometers (Km) in diameter. Metro Ethernet Access networks, in contrast to traditional networks, are scalable and flexible and easy to extend.

Figure 2:
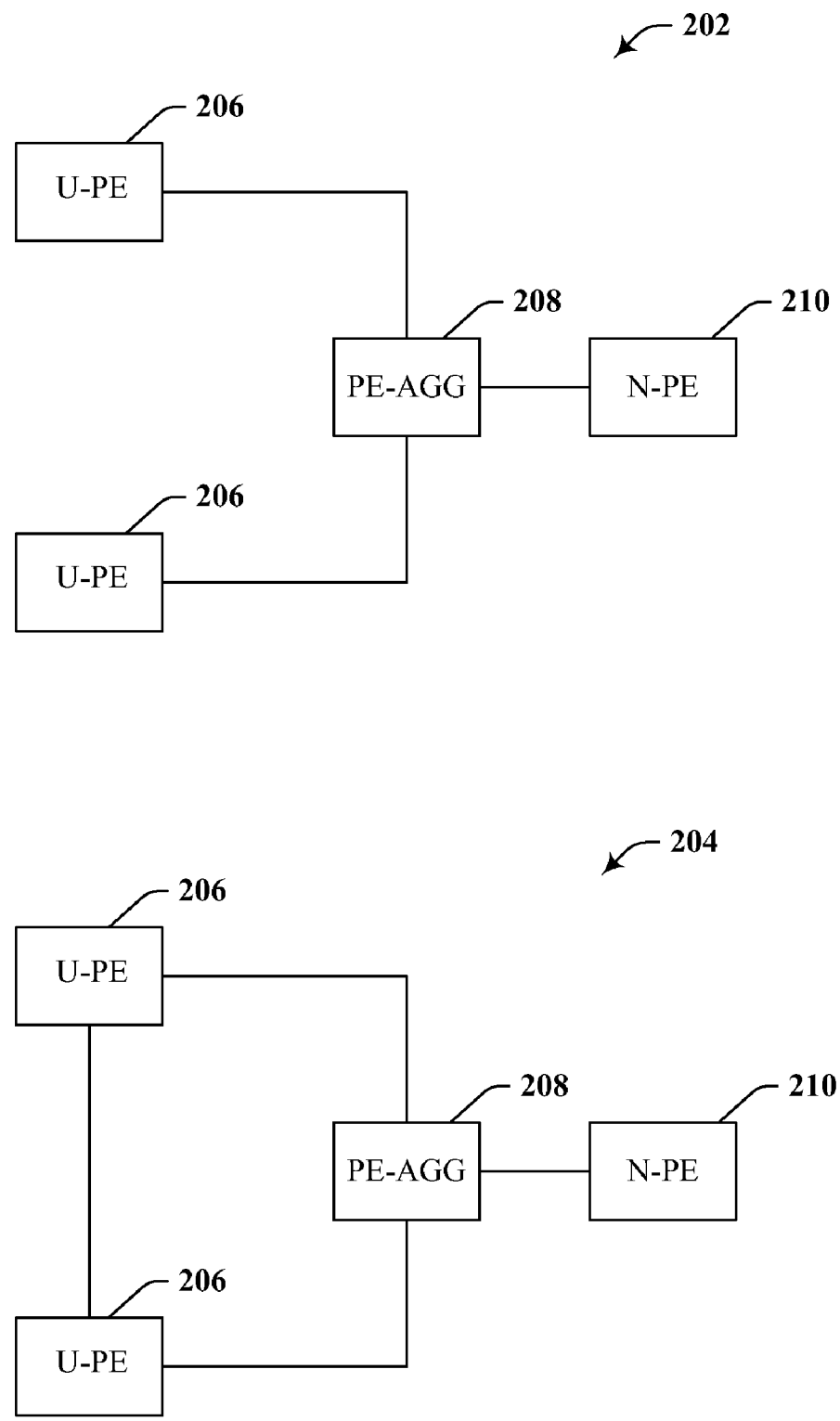
FIG. 2 illustrates network architecture of the example dynamic network topologies.

FIG. 2 illustrates a topology of the example Metro Ethernet network 104 in accordance with an aspect of the specification. It can be appreciated that the topology is not limited to a Metro Ethernet Access network and can be applied to most any dynamic network. Metro Ethernets can provide various services that can be described according to their scope or reach in the network and can be classified as Intra-EAD and Inter-EAD services depending on whether the service end-points reside within one EAD or reside among two or more EADs respectively.

Typically, most Metro Ethernet deployments for service providers follow two most frequently used topologies, namely, hub-spoke topology 202 and ring topology 204. A hub-spoke topology 202 is type of a star topology, which has a hub at the center of the star, resembling the hub and spokes of a wheel. All the peripheral (spoke) nodes are connect to the central hub and can transmit data to any other node through the hub. A ring topology 204 comprises of a system wherein each node in the network is connected to two other nodes in the network such that the first and the last node are connected with each other to form a ring. In a ring topology, data flows through the ring in a circular manner and is generally transmitted in a single direction from one node to another. The decision to adopt a particular topology can be set according to fiber availability.

Metro Ethernet architectural layers can typically be broken down into different categories, namely, Layer 2 Ethernet access layer, Layer 2 Ethernet aggregation layer, Layer 2 Ethernet/MLPS (multi protocol label switching) edge layer and MLPS Core Layer. The devices within the network can be assigned with certain roles, such as, User-facing provider edge (U-PE) 206 within the access layer, Provider edge aggregation (PE-AGG) 208 within the aggregation layer, Network-facing provider edge (N-PE) 210 within the edge layer or Provider core within the core layer. A Metro Ethernet deployment may or may not contain all the above mentioned layers, in some cases, the architectural function of various layers can be merged into a single layer and platform.

Figure 3:
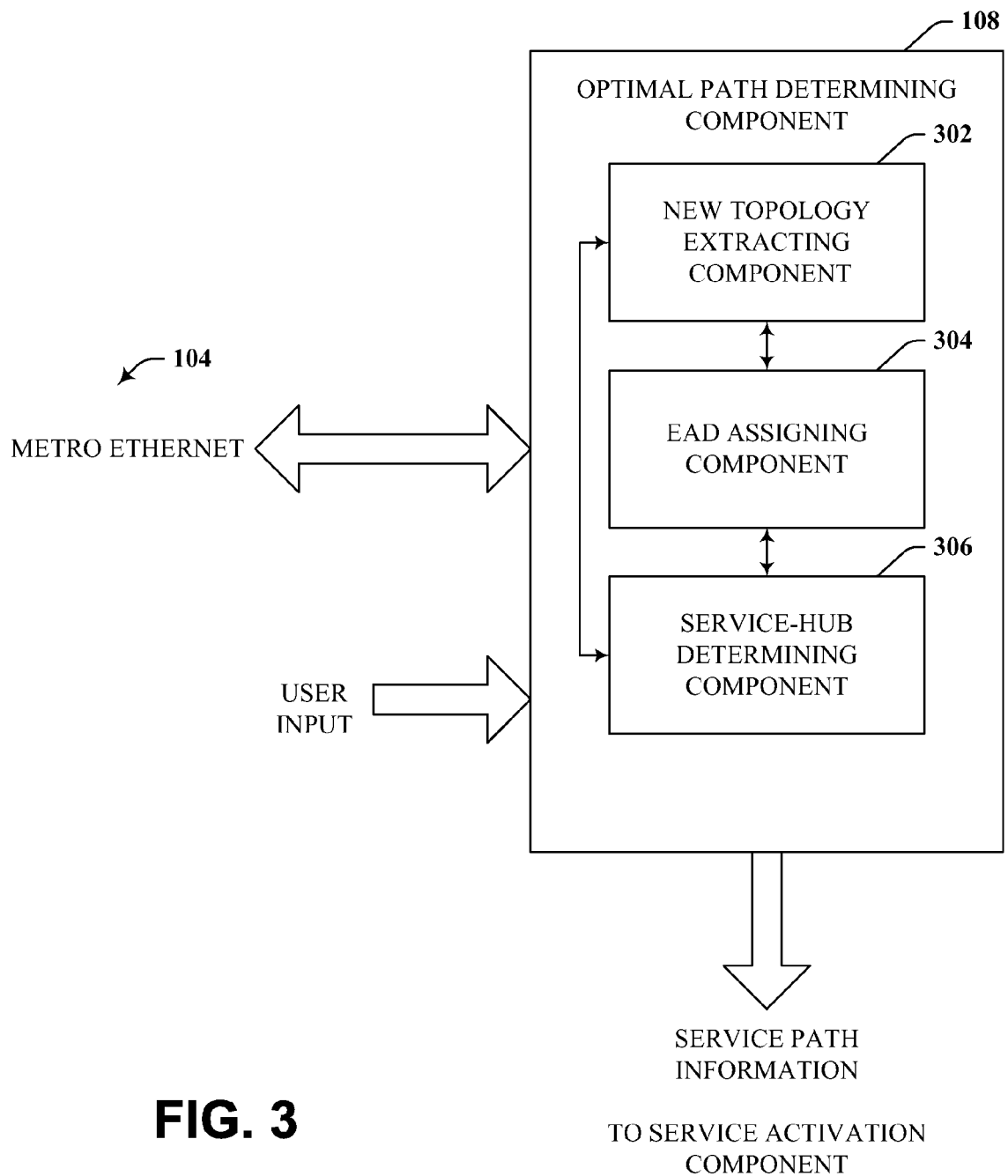
FIG. 3 illustrates a system that can determine an optimal service path for a new service employing current topology information of the dynamic network in accordance with one aspect of the specification.

Referring now to FIG. 3, illustrated is an optimal service path determining component 106 in accordance with one aspect of the specification. The optimal service path determining component 106 can discover an optimal path for new service activation employing the current topology of the network. The Metro Ethernet 104 has a dynamically changing topology which can be monitored and tracked by a new topology extracting component 302.

Typically, a variety of mechanisms can be employed to determine the adjacencies between the devices slated to be inserted in an EAD. The discovered adjacencies can be utilized to populate a database employed by a network management tool. The new topology extracting component 302 can extract information regarding the current topology from a database (not shown) which is further utilized to discover an optimal service activation path. The new topology extracting component 302 can also assign service roles to a set of devices and logically build a new topology for an EAD.

An EAD assigning component 304 is employed during initialization to assign and/or determine the EAD the new device would belong to after which the EAD for a new device can be deduced from the adjacent devices. The new device can be assigned the same EAD that the adjacent device belongs to.

Depending on the UNIs selected by the operator belonging to a same or different EAD, a service path can be determined employing the adjacencies that have already been discovered. The service-hub determining component 306 can identify a service-hub for the new service. If the UNI device belongs to the same EAD then a PE-AGG closest to the two UNIs belonging to the same EAD can be selected as the service-hub else, if the UNI belongs to a different EAD then the N-PE connected to the core network can be chosen as the service-hub.

The service activation path can be determined by a combination of shortest path using standardized algorithms over the discovered adjacencies, service roles (U-PE, PE-AGG or N-PE) assigned to the devices by the operator and the service-hub for a particular UNI as determined above. The optimal path once determined can be confirmed by the operator. The operator can be provided with an option to manually select another path if the operator is not satisfied with the optimal path determined by the system.

Figure 4:
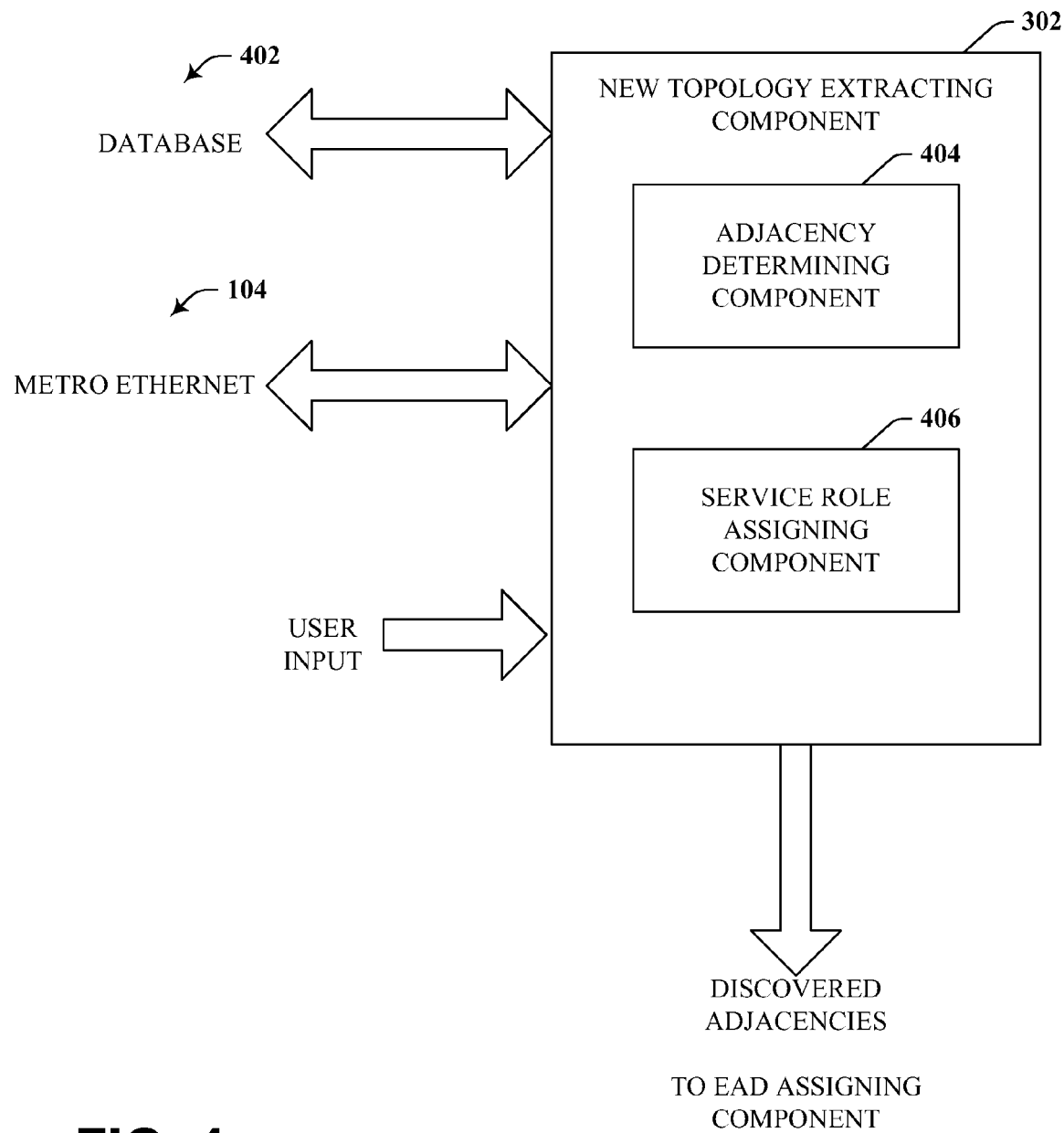
FIG. 4 illustrates a block diagram of a system that extracts current topology information of the example dynamic network.

FIG. 4 illustrates an example new topology extracting component 302 that extracts topology information from a database employed by a network management tool. An adjacency determining component 404 can determine adjacencies between the devices inserted in an EAD from a database 402 to determine the current topology of the Metro Ethernet 104.

A service role assigning component 406 can be employed in the new topology extracting component 302 to assign logical roles to the network devices. The devices can operate in various roles such as U-PE, PE-AGG, N-PE or provider core. The device with the U-PE role can act as the demarcation point between the customer and the service provider network. Typically, the U-PE can be a Layer 2 device located in the access layer at the customer premises or outside a customer premises but owned and managed by the service provider. A U-PE device can be employed to aggregate multiple customers at the access layer and to define Ethernet services by providing appropriate UNI characteristics. A U-PE can also be responsible to segregate customer traffic, offer traffic multiplexing and congestion management, enforce service and admission control policies of the network and help ensure the bandwidth meets the required service level agreement (SLA).

The device assigned the PE-AGG role resides in the aggregation network layer between access and edge devices. The aggregation layer provides a method to scale the number of access devices connected to edge platforms. The PE-AGG device can be employed for efficient aggregation of traffic, traffic multiplexing and congestion management, and local switching for Ethernet services.

N-PE devices can act as the demarcation point between Layer 2 protocols in the EAD and a Layer 3 domain (if in presence of an MLPS core). Therefore, the edge device interfaces directly to the access (or aggregation) network and if required, to the MLPS core. At the edge, service provider VLANs (Virtual LANs) are mapped to Ethernet-over-MLPS (EOMLPS) virtual circuits for point-to-point services or to Virtual Private LAN Services (VPLS) instances for multipoint-to-multipoint services. N-PE devices can perform various functions such as, MLPS and IP services gateway, VPLS and Virtual Private Wire Service (VPWS) definitions, Layer 2 VPN service interworking gateway, Layer 3 VPN service layer, local switching for Ethernet services, MAC addresses learning for Layer 2 multipoint VPNs, sophisticated traffic and congestion management, load balancing across equal-cost multipath links, and redundancy mechanisms for e EADs with two or more N-PEs.

During initialization the operator can assign devices with the above device roles after which the discovered adjacencies can be used to make devices part of an EAD. A graphical user interface (GUI) can be used by the operator to assign service roles to the devices. Examples of GUIs will be described below with reference to FIGS. 9, 10 and 11 that follow.

Figure 5:
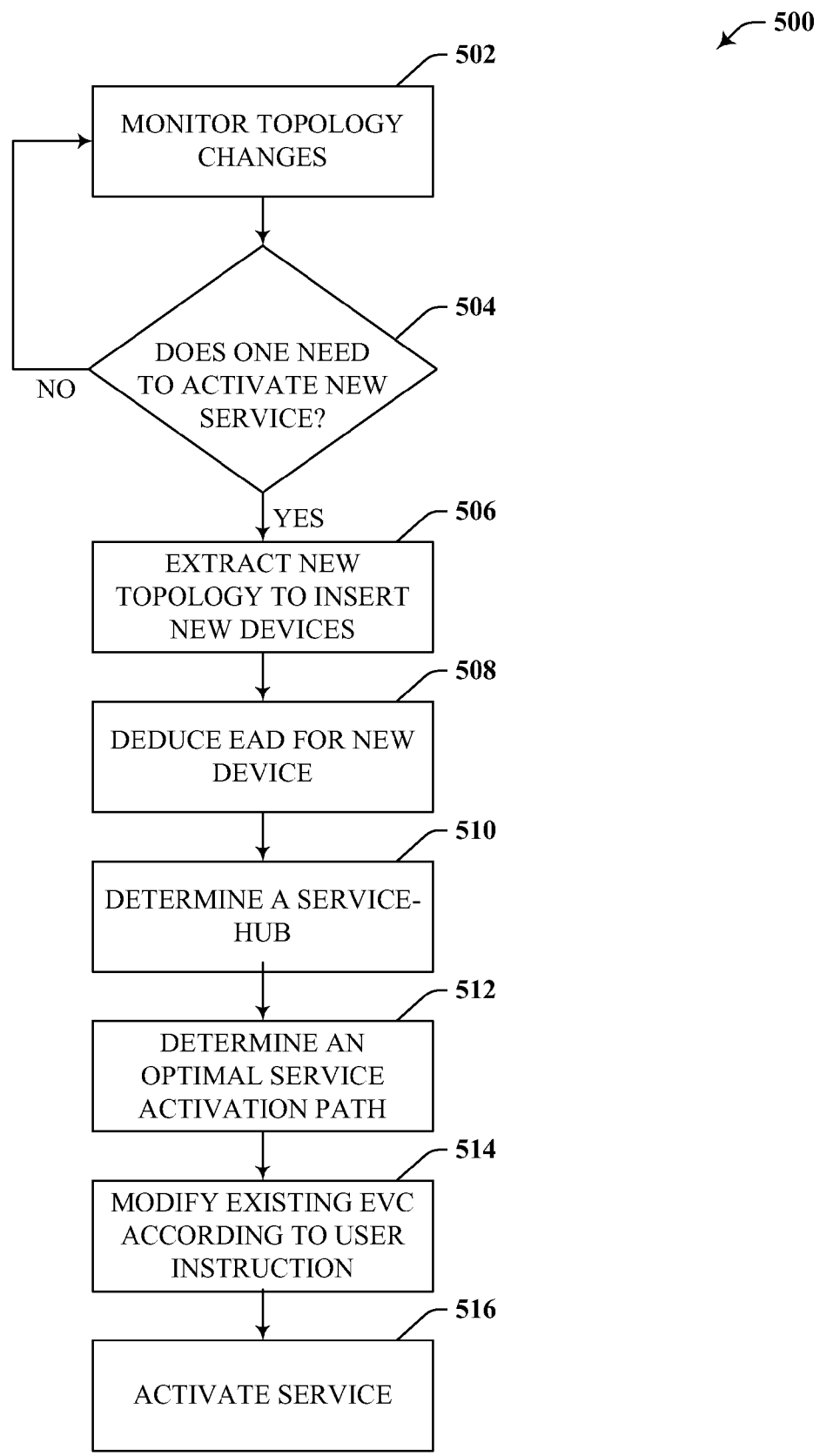
FIG. 5 illustrates an example flow chart of procedures that facilitate a new service activation that employs current topology in accordance with an aspect of the specification.

FIG. 5 illustrates a methodology 500 of activation of a new service in accordance with an aspect of the specification. While, for purposes of simplicity of explanation, the one or more methodologies shown herein, e.g. in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

Referring to FIG. 5, changes in network topology can be monitored at 502 until a new service is to be activated. As shown by a decision box 504, a determination can be made if a new service can be activated. If a new service is to be activated, the current topology information is extracted from a database at 506; else the system continues to monitor the dynamic topology.

The current topology information can be employed to deduce an EAD for the new device. During initialization, EAD assignment can be manually entered by the operator after which the EAD can be deduced from the neighboring devices. Once the EAD is known, a service-hub can determined at 510. An optimal service activation path can be determined at 512 employing standardized algorithms over the discovered adjacencies, service roles, and the service-hub for a particular UNI.

At 514, it is possible for the user to return and modify the existing EVC to insert more UNIs. Accordingly, the EVC can be modified and new service-hubs for the new UNIs can be determined. The determination of service-hubs depends on whether the new UNI to be inserted belongs to a new EAD or belongs to an EAD that has already been services by the EVC.

Once the optimal path is determined at 512, the user can be prompted to confirm this path for activation of service. If the user is satisfied with the path determined, the user can confirm activation of service via this path. The final end-to-end service is established and activated at 516.

Figure 6:
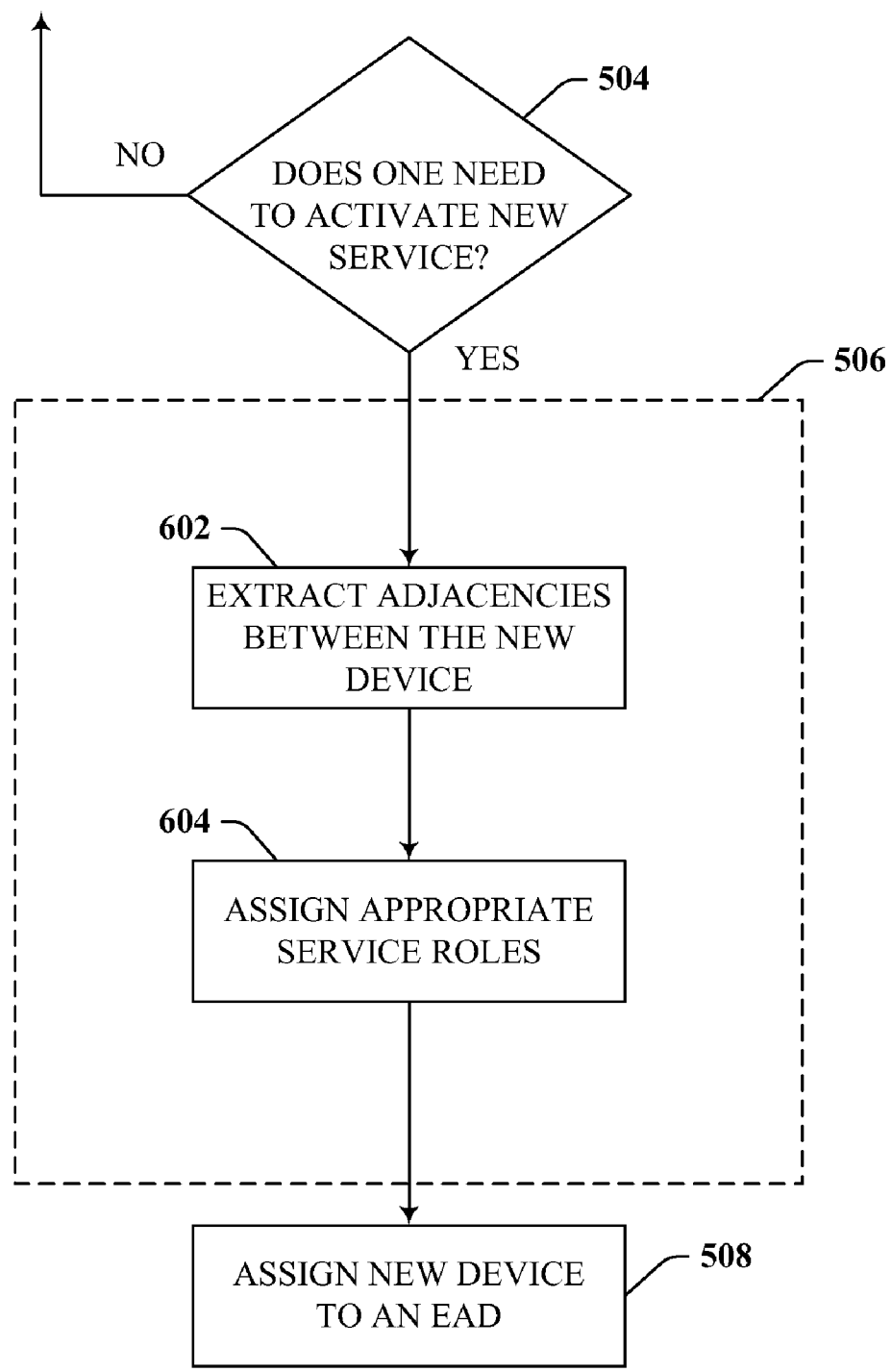
FIG. 6 illustrates an example flow chart of procedures that facilitate extraction of new topology data when a new device is to be inserted to activate a new service in accordance with an aspect of the specification.

Referring now to FIG. 6, there is illustrated a methodology of extraction of topology information in accordance with the innovation. If it is determined that a new service is to be activated, as shown by a decision box 504, current topology information can be extracted from a repository at 506. Typically, a network management system can contain an inbuilt repository of information regarding a snapshot of devices existing in the network. In aspects, this repository can be automatically populated by an external tool. The topology information obtained from the repository can include adjacencies between the new devices. The adjacency information can be extracted at 602 in order to lay out the network at system setup. During initialization, the assignment of device roles can be set by the operator to configure the network as shown at 604. The above topology information is then utilized to assign the new device to an EAD.

Figure 7:
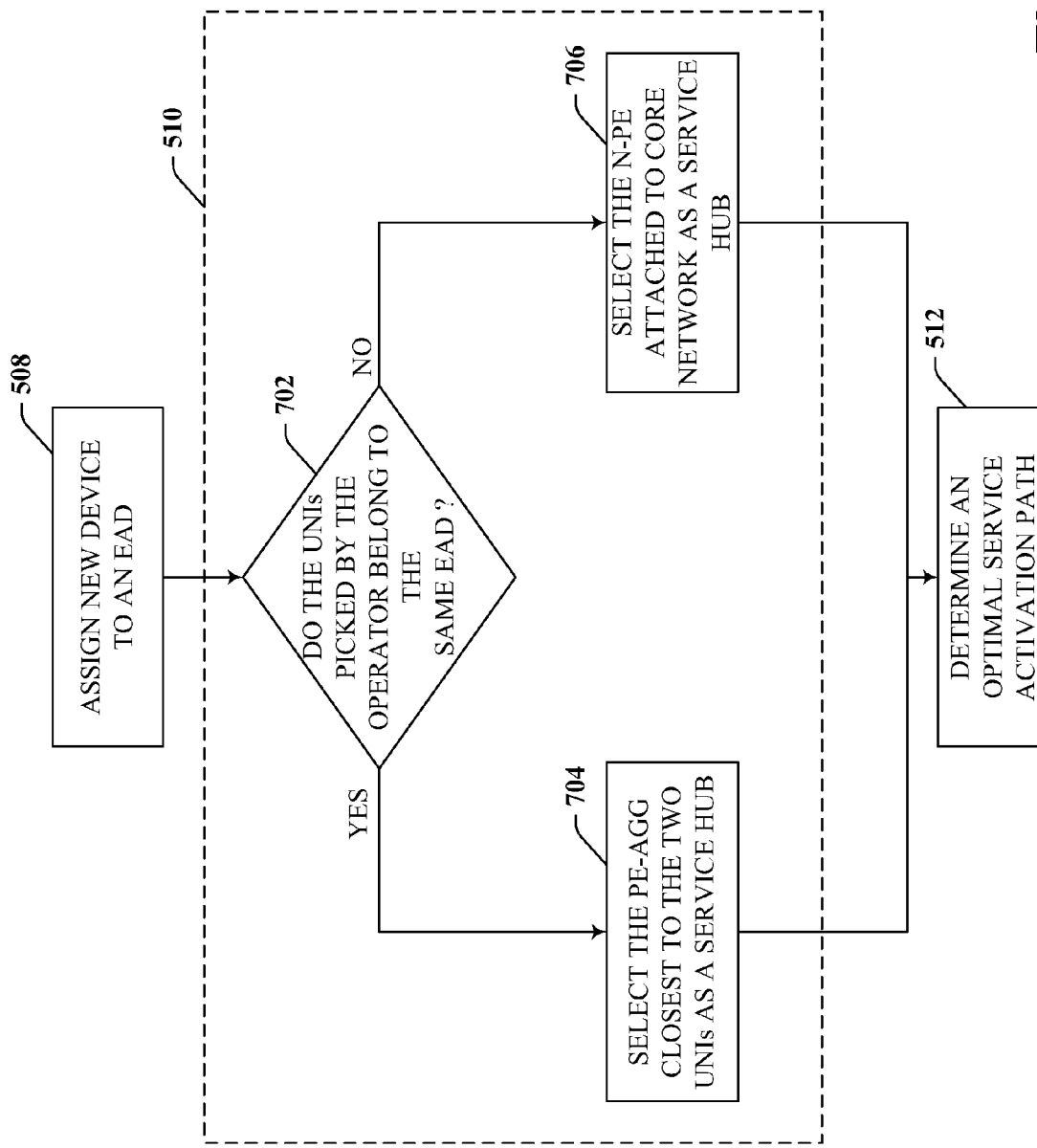
FIG. 7 illustrates an example flow chart of procedures that facilitate determination of a service-hub depending on the UNIs selected by an operator belonging to the same EAD or belonging to different EADs.

Referring to FIG. 7, when a new device is assigned to an EAD, a service-hub can be determined to discover an optimal path to be traversed to activate the service. FIG. 7 illustrates a flowchart that represents a methodology for determination of a device that can serve as a service-hub. The determination can be based on the EADs that the UNIs, picked by the operator, belong to and is shown in the decision box 702.

When the UNI device belongs to the same EAD then the PE-AGG closest to the two UNIs belonging to the same EAD can be picked as a service-hub, as shown at 704. When the UNI device belongs to a different EAD then the N-PE device connected to the core network can be picked as a service-hub, as shown at 706. Once the service-hub is selected an optimal path for service activation can be determined at 512.

Figure 8:
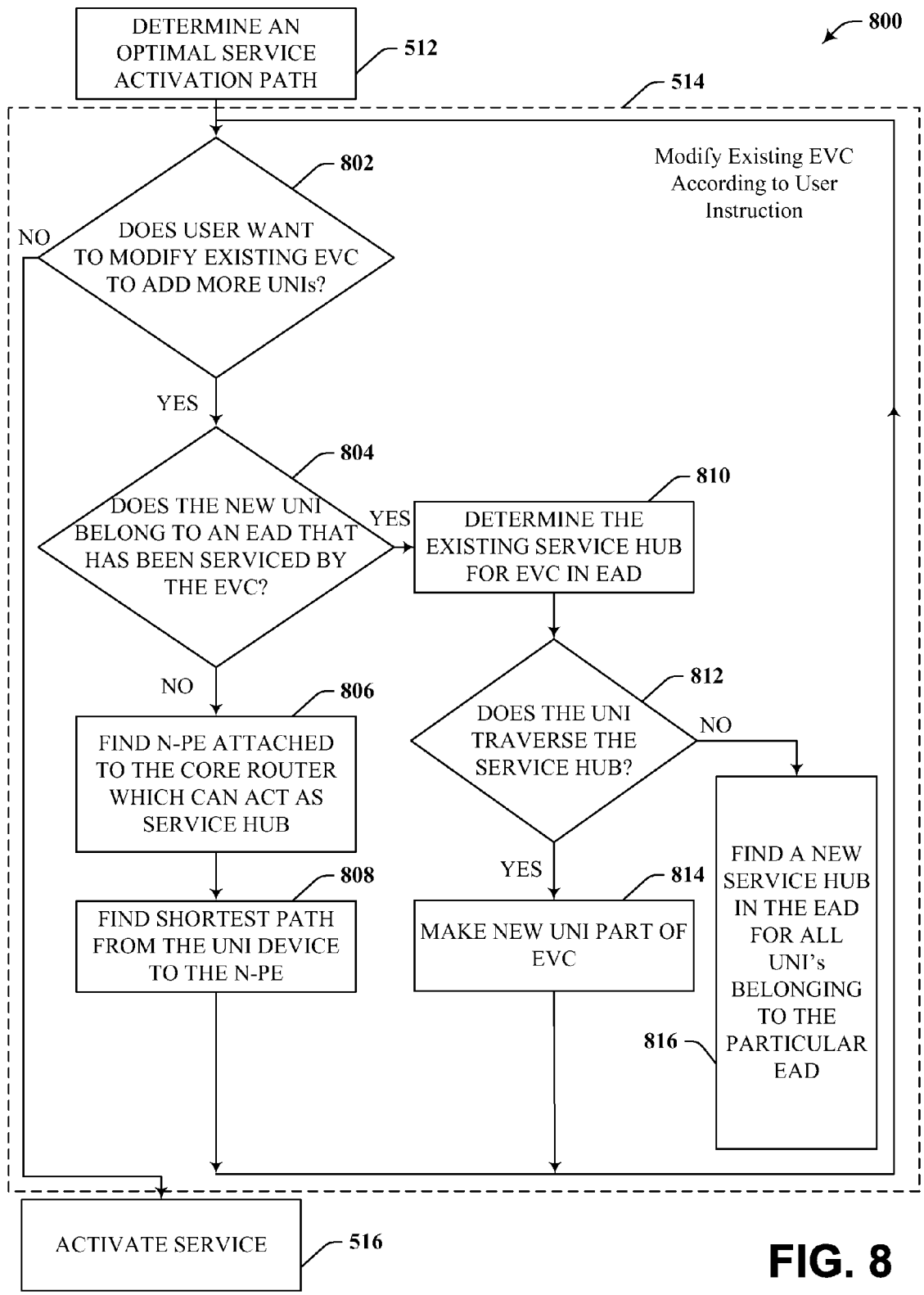
FIG. 8 illustrates an example flow chart of procedures, in accordance with an aspect of the specification, that facilitate modification of an existing EVC by a user on addition of more UNIs.

The user can be provided with an option to add more UNIs and modify the existing EVC. If the user wishes to add new devices, one must determine a new service-hub and find an optimal service path. FIG. 8 illustrates a methodology 800 of modification of an existing EVC by insertion of new devices in accordance with an aspect of the specification. As shown by decision box 802 the user can be prompted to add new UNIs. If it is determined that the user wishes to add more UNIs, the system can check which EAD the new UNI would belong to else continue service activation for old UNI.

When the user wishes to add more devices, a determination of the EAD that the new UNI belongs to can be made at 804. If it is determined that the new UNI belongs to an EAD that has not been services by the EVC, then the N-PE device attached to the core router can be selected as a service-hub at 806. Once a service-hub is determined, a shortest path from the UNI device to the N-PE can be determined at 808. The user can be prompted once more if new UNIs are still to be added. If the user wishes to add new UNIs the above procedure can be repeated else the service can be activated at 516 based upon information regarding shortest path and service-hubs.

If at 804 it is determined that the UNI to be added belongs to an EAD that has already been serviced by the EVC, then, the existing service-hub for that EVC in the EAD is determined at 810. Furthermore, it can then be determined if the new UNI to be added traverses that service-hub, as shown by the decision box 812. If the UNI traverses the existing service-hub for the EVC, then the UNI is made part of the EVC at 814. If the UNI does not traverse the existing service-hub for the EVC, then, as shown at 816, a new service-hub can be determined in the EAD for all the UNIs belonging to the particular EAD. Once service-hubs have been identified, the user can be prompted to add more UNIs if required, else service can be activated.

Figure 9:
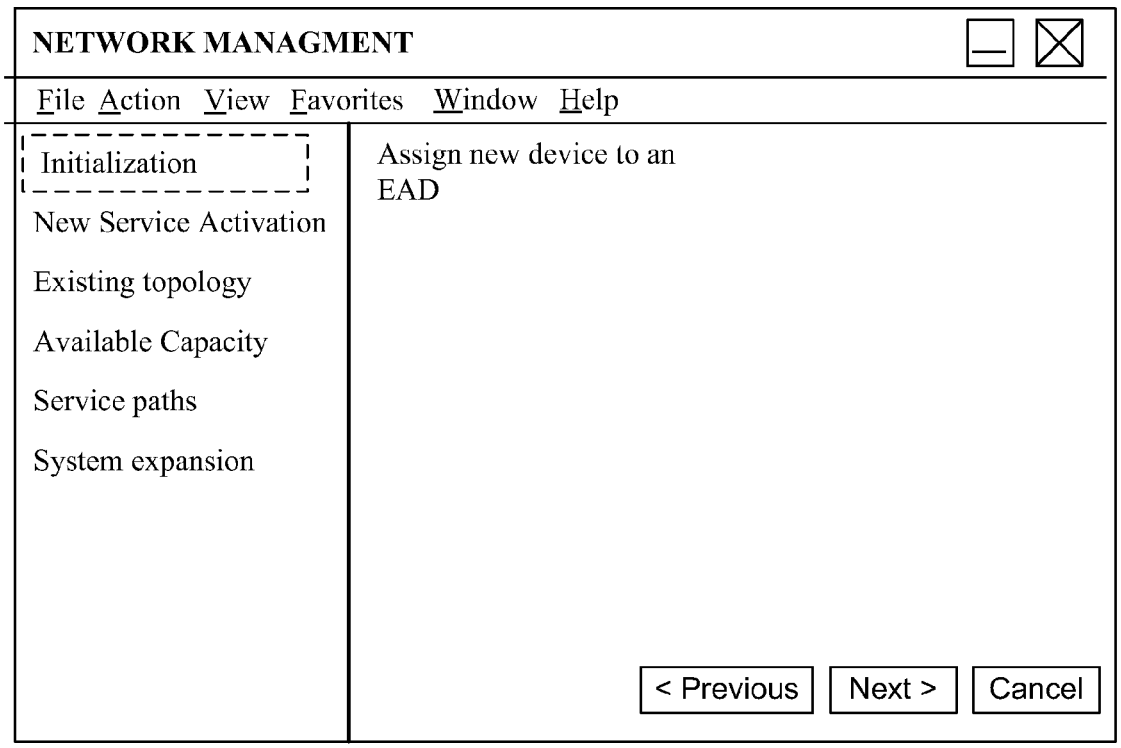
FIG. 9 illustrates an example GUI (Graphical User Interface) that can assist a user initialize the system and view selected attributes of the system.
Figure 10:
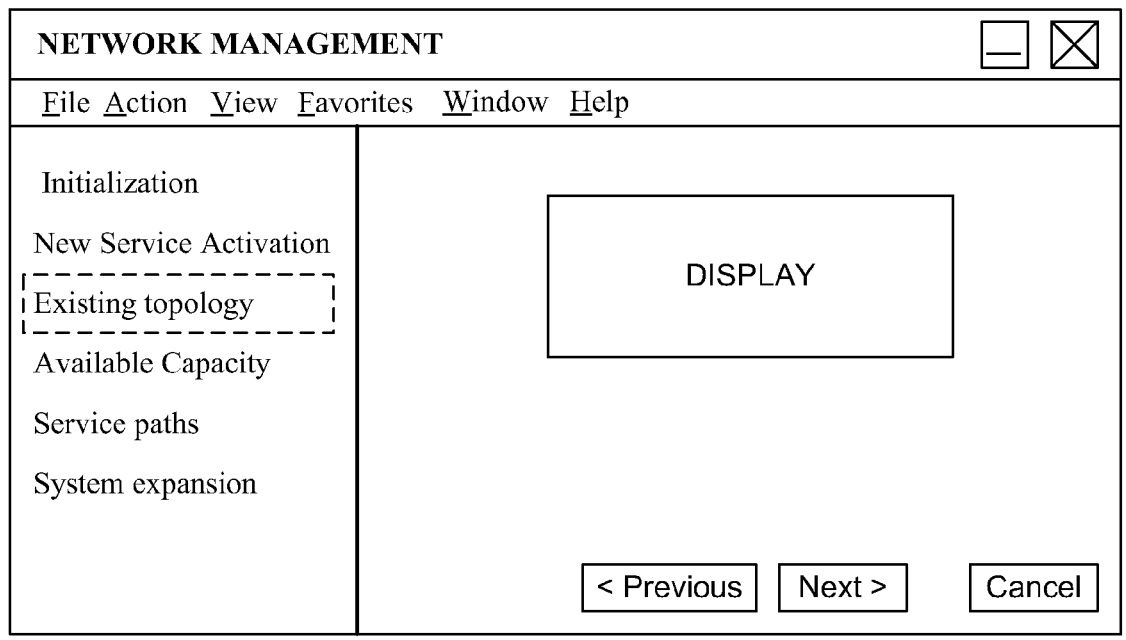
FIG. 10 illustrates an example GUI that can assist a user view the current topology of the dynamic network in accordance with one aspect of the system.
Figure 11:
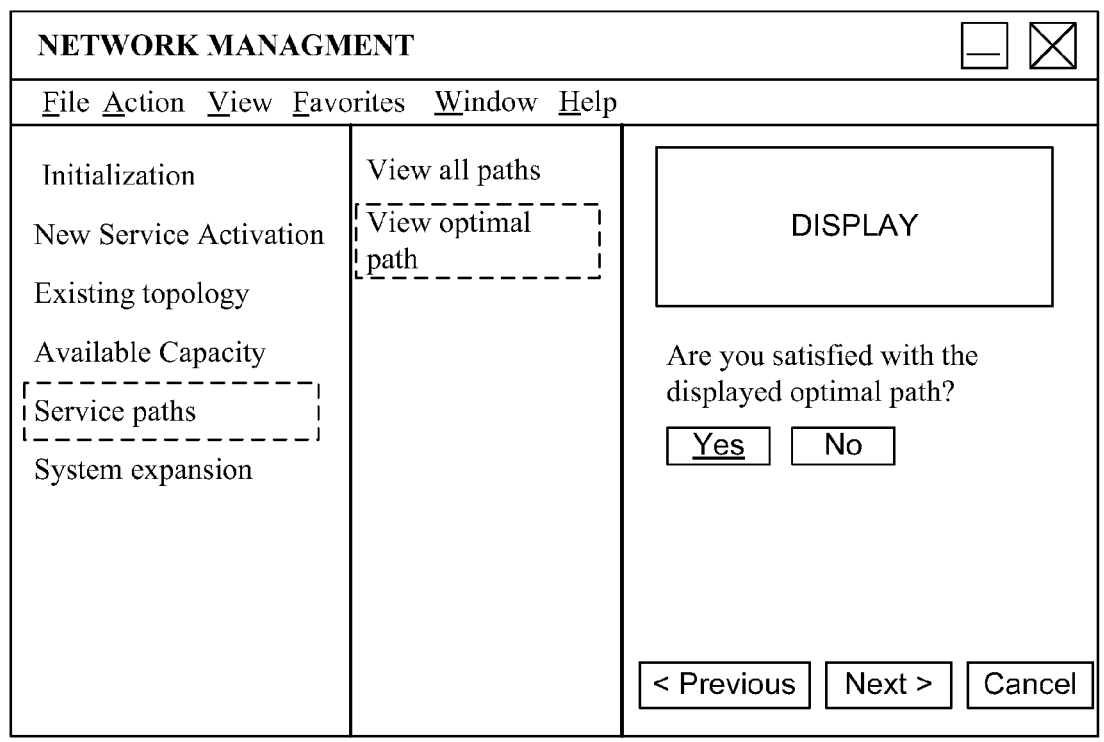
FIG. 11 illustrates an example GUI that helps view an optimal service path determined by the system for activation of a new service and provides an option for a user to select and confirm the path to be employed for activation of service.

FIG. 9, FIG. 10 and FIG. 11 illustrate example GUIs in accordance with aspects of the subject specification. The user interface enables a user, for example, a service provider to interact with the system. It is noted that the display can be in the form of a graphics, textual, and/or numerical display and can include associated audio output. The example GUI illustrates a screenshot of a network management tool. The network management tool interface can include a menu with option such as, but not limited to, Initialization, New service activation, Existing topology, Available capacity, Service paths and System expansion.

Referring to FIG. 9, the interface 900 can enable a user to initialize the system by selecting the Initialization tab from the menu. The initialization tab can help the user set up the system and lay out the network. At system start up the user can assign service roles, such as, U-PE, PE-AGG or N-PE, to a set of devices and employ the discovered adjacencies to make the devices part of an EAD.

FIG. 10 illustrates another example screenshot of the GUI in accordance with one aspect of the specification. The auto topology monitoring component 106 (Refer to FIG. 1) continuously monitors and tracks changes in topology of the dynamic Metro Ethernet 104 (Refer to FIG. 1). This information regarding current topology can be displayed to the user at any point in time. As shown by the interface 1000, a user can select the existing topology tab to view the current topology of the network. The display can be but is not limited to a pictorial representation of the network topology.

FIG. 11 illustrates an example display output for the network management tool. In accordance with one aspect of the specification, the user can view the optimal service path determined by the system at 1100. Furthermore, the system can confirm if the user is satisfied with the generated optimal path. An option for viewing all other service path and/or selecting another path can be provisioned in case the user would like to change the optimal path generated by the system and use another path for service activation.

Figure 12:
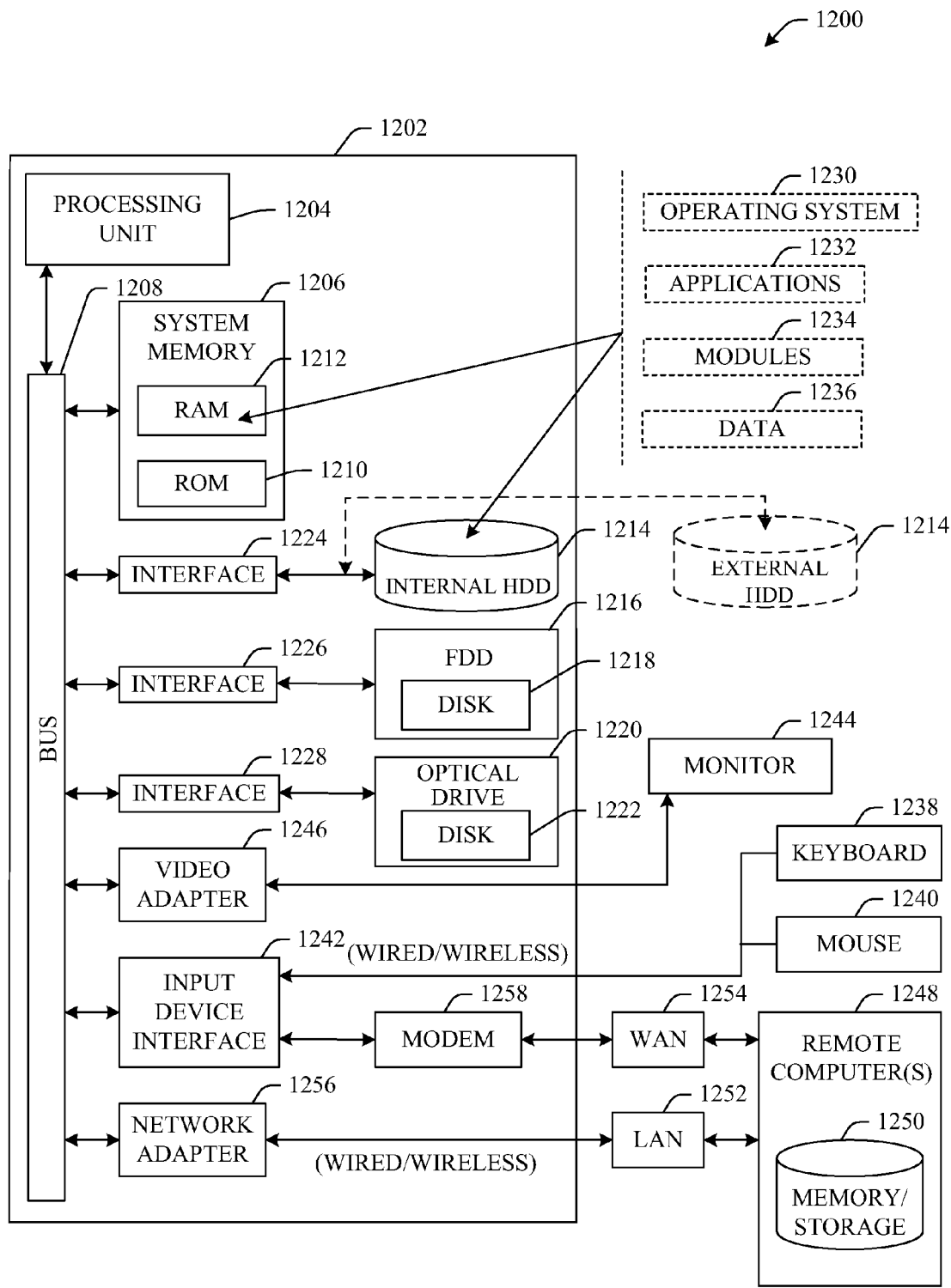
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, micro-processor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g. a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g. a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A dynamic network management system, comprising:
an optimal service path determining component to,
extract a current topology of a dynamic network to determine neighboring devices to a new device to be added to the dynamic network for activation of a new end-to-end service, deduce an Ethernet Access Domain (EAD), from the neighboring devices, for the new device to be added to the dynamic network for establishing the new end-to-end service, and automatically determine a service-hub, based at least in part on the EAD for the new device, for activation of the new end-to-end service, and determine an optimal path for activation of the new end-to-end service based on the current topology, EAD, and the service-hub for the new device, wherein a Network-facing provider edge (N-PE) device is selected as the service-hub if the new UNI (User to Network Interface) to be added does not belong to the same Ethernet Access Domain (EAD); and a service activation component that establishes the new end-to-end service via the determined optimal path without manual topology information feed.

2. The system of claim 1, wherein the dynamic network is a Metro Ethernet Access network with at least one of a ring or hub-spoke topology.

3. The system of claim 1, further comprising an auto topology monitoring component that monitors the current topology of the dynamic network and assists in determining the optimal path.

4. The system of claim 1, wherein the optimal service path determining component can extract topology information from a repository of information regarding a snapshot of devices existing in the dynamic network to discover adjacencies between neighboring devices that can be employed to determine the optimal path.

5. The system of claim 1, wherein a Provider Edge Aggregation (PE-AGG) device is selected as the service-hub if the new UNI (User to Network Interface) to be added belongs to the same Ethernet Access Domain (EAD).

6. A system that facilitates activation of a new service, the system comprising:

means for determining a change in topology of a network;

means for employing current topology information to determine a service-hub for the new service;

means for automatically assigning a new device in the network to an Ethernet Access Domain (EAD) based on determining an EAD for neighboring devices, the assigning done as part of the activation of the new service;

means for determining an optimal service path for the new service based on the current topology and the service-hub and for automatically determining a service-hub in the optimal path for activation of the new service, wherein a Network-facing provider edge (N-PE) device is selected as the service-hub if the new UNI (User to Network Interface) to be added does not belong to the same Ethernet Access Domain (EAD); and means for activating the new service without manual entry of information regarding network topology service via the determined optimal path.

7. The system of claim 6, further comprising means for manually initializing the network at system startup to layout the topology of the network.

8. The system of claim 7, further comprising means for extracting current topology information from a repository to discover adjacencies between devices of the network, wherein a subset of the adjacencies is employed in determining the optimal service path.

9. The system of claim 7, further comprising means for assigning logical service roles to devices in the network to logically build the topology.

10. The system of claim 6, further comprising means for interacting with the system to establish a baseline, wherein the baseline is employed to initialize the system.

11. A method for topology aware service activation, the method comprising:

monitoring and tracking a change in current network topology, including deducing, from neighboring devices, an Ethernet Access Domain (EAD) for a new device to be added to the network for establishing a new service;

determining an optimal service activation path for activation of the new service;

automatically selecting a device to act as a service-hub in the optimal service path;

determining a new service-hub in the Ethernet Access Domain (EAD) for all UNIs (User Network Interfaces) belonging to a particular EAD if a new UNI is serviced by an existing Ethernet Virtual Connection (EVC) but does not traverse the existing service-hub; and activating a new service via the optimal service activation path based on information regarding the service-hub, the EAD of the new device, and current network topology.

12. The method of claim 11, further comprising modifying an existing Ethernet Virtual Connection (EVC) to add a new User Network Interface (UNI) for activation of the new service according to user instruction.

13. The method of claim 12, further comprising checking if the new UNI has been serviced by the EVC for determining a service-hub to be employed to activate the new service.

14. The method of claim 12, further comprising selecting an N-PE device to act as a service-hub if the new UNI is not serviced by the EVC and activating the new service employing the optimal service path determined by the service-hub.

15. The method of claim 12, further comprising selecting the existing service-hub for the EVC if the new UNI is serviced by the EVC and the UNI traverses the existing service-hub and activating the new service employing the optimal service path determined by the service-hub.

* * * * *